US006897880B2

(12) United States Patent
Samra

(10) Patent No.: US 6,897,880 B2
(45) Date of Patent: May 24, 2005

(54) USER INTERFACE FOR GENERATING PARAMETER VALUES IN MEDIA PRESENTATIONS BASED ON SELECTED PRESENTATION INSTANCES

(75) Inventor: Sukendeep Samra, Venice, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 164 days.

(21) Appl. No.: 09/929,276

(22) Filed: Aug. 13, 2001

(65) Prior Publication Data

US 2002/0171668 A1 Nov. 21, 2002

Related U.S. Application Data

(60) Provisional application No. 60/271,376, filed on Feb. 22, 2001, and provisional application No. 60/284,660, filed on Apr. 17, 2001.

(51) Int. Cl.[7] ................................................. G09G 5/00
(52) U.S. Cl. ....................... 345/619; 345/581; 345/629; 345/635; 345/638; 345/700; 345/711; 345/861; 345/862
(58) Field of Search ................................. 345/581, 629, 345/630, 634, 635, 638, 700, 704, 708, 711, 593, 856, 861, 862

(56) References Cited

U.S. PATENT DOCUMENTS

| | | | | |
|---|---|---|---|---|
| 4,538,188 A | * | 8/1985 | Barker et al. ................. | 386/54 |
| 5,237,648 A | * | 8/1993 | Mills et al. .................. | 345/723 |
| 5,513,306 A | * | 4/1996 | Mills et al. .................. | 715/530 |
| 5,760,767 A | * | 6/1998 | Shore et al. ................. | 345/723 |
| 5,930,446 A | * | 7/1999 | Kanda .......................... | 386/52 |
| 6,046,722 A | * | 4/2000 | McKiel, Jr. .................. | 345/862 |
| 6,204,840 B1 | * | 3/2001 | Petelycky et al. ........ | 715/500.1 |
| 6,392,674 B1 | * | 5/2002 | Hiraki et al. ................ | 345/857 |
| 6,470,100 B2 | * | 10/2002 | Horiuchi ...................... | 382/295 |
| 6,587,123 B2 | * | 7/2003 | Ando et al. .................. | 345/723 |
| 6,597,375 B1 | * | 7/2003 | Yawitz ........................ | 345/723 |

* cited by examiner

*Primary Examiner*—Michael Razavi
*Assistant Examiner*—Daniel Chung
(74) *Attorney, Agent, or Firm*—Charles J. Kulas; Carpenter & Kulas, LLP

(57) ABSTRACT

A system providing a user interface to allow a user to easily modify parameters of media presentations such as images and audio. The user selects first and second reference instances, such as images. The images are described by parameters and parameter values. Differences between the images' parameter/value characteristics are identified. The first and second reference images are placed at different points on a display screen. By moving a pointer relative to the positions of the first and second reference images, a current image is generated that is a combination, or function, of the identified parameter/value characteristics. Thus, the user is able to quickly, and intuitively, achieve many desired modifications to the media. A feature of the invention allows image content to be modified in a similar manner. First and second computer model positions, animations, bitmap images, etc., can be used and the same technique employed to create many derivations from the selected reference images. Multiple parameters can be changed concurrently. A user can be presented with a list of parameters so that the user can selectively enable or disable parameters to be changed.

11 Claims, 5 Drawing Sheets

USER INTERFACE FOR GENERATING PARAMETER VALUES IN MEDIA PRESENTATIONS BASED ON SELECTED PRESENTATION INSTANCES

CLAIM OF PRIORITY

This application claims priority from the following co-pending U.S. Provisional Patent Applications:

1. Application Ser. No. 60/271,376; filed Feb. 22, 2001, entitled "A System and Method for Editing" (client docket 50P4410); and 2. Application Ser. No. 60/284,660; filed Apr. 17, 2001, entitled "Advanced System and Method for Editing" (client docket 50R4639).

CROSS-REFERENCE TO RELATED APPLICATIONS

This application is related to the following co-pending U.S. patent applications:

1. Application Ser. No. 09/665,721; filed Sep. 18, 2000, entitled "System And Method For Optimizing The Processing Of Images" (client docket 50N3647) and 2. Application Ser. No. 09/691,795; filed Oct. 18, 2000, "System And Method For Increasing Performance When Compositing Images" (client docket 50N3649).

BACKGROUND OF THE INVENTION

Today, digital systems are used to represent and process virtually all types of media in commercial, entertainment, educational and other fields. For example, visual media such as photographs, movies, video and animations are largely handled in the digital domain. Similarly, audio media such as speech, music, sound effects, etc., are also recorded, edited, produced, copied and transferred in the digital domain. Other applications for digital systems include the growing e-commerce marketplace where buyers can select from millions of different products and services online, such as via the Internet.

Although digital systems provide many benefits, the incredible speed and versatility of such systems to access and manipulate media and other information is often overwhelming to a human user. For example, in the visual media areas many types of non-linear editing operations can be performed to create a movie or video, or to modify, correct or otherwise change image areas or sequences of images. Art directors, graphics designers, engineers, producers or other users of computer workstations can perform dozens of different operations on any of millions of pixel elements in a typical image or series of images. Such operations include color changes, sharpness corrections; visual effects, combinations or composites of different images, scene transitions, etc.

Many of the objects in today's visual media are created digitally in the first place. For example, a computer-generated model may be used to represent an object or character in a movie scene or still picture. Not only do human user's have complete control of the model's shape, color scheme, texture, lighting and movement; but once a scene is rendered, the rendered sequence of images can be further modified as described above.

The process of creating visual media is multiplied in complexity since many types of manipulation can affect the outcome of subsequent manipulations. For example, a color correction may affect a later chromakey operation, a contrast adjustment can change an anti-aliasing filterj's effect, and so on. Similar layers of complexity exist in creating and processing other digital media such as audio.

Amidst all of the complexity, a human user must decide which operations to perform to achieve a desired result. The process of applying operations to media is often achieved as a change in attributes, or parameters, of the media. For example, an image can have parameters of color components, filter effects, transitions, etc. Each parameter typically has a single numeric value. Changing the parameter's value creates a change in the quality of the image associated with the parameter. Thus, increasing the value of a parameter that expresses the amount of red in an image will cause the image to appear more red.

Parameters can be used to describe many aspects of digital media and information. Because parameters are a useful way to describe and modify digital media, several prior art approaches exist to allow a human user to modify media parameters and to present media to a user based on original and modified parameters.

One approach is to use alphanumeric text to name a parameter and the parameter's value. This is useful where a parameter can easily be described with a text label and where the effect of modifying a parameter value is intuitive. For example, when intensity of color components of an image is specified as a function of red, green and blue (RGB) additive colors, the intensity can range from 0 to 100 percent. Thus, a user can type in a value for each of "green," "red" and "blue" fields on a display and have some notion of the outcome of modifying the parameter values. Similarly, with audio volume, a "volume" parameter can receive a value in percent, decibels, etc.

Once a parameter or parameters has been modified, the user can direct the media to be presented using the new parameters. This can mean an image is redisplayed using the new color components intensities or that an audio segment is played back at a new volume level.

Although alphanumeric parameter presentation and modification is easily implemented, it is often difficult and cumbersome for a user to work with such an interface. This is partly due to the sheer number of different parameters that may be present in a media presentation. Also, some parameter labels do not effectively convey an intuitive purpose. For example, RGB, luminance and chrominance are parameters that are used to describe images. Most users who have not spent a lot of time working with such parameters will not be able to accurately predict what effect modifying a parameter will have on the presentation. This leads to a trial-and-error approach.

One improvement over simple alphanumeric presentation and modification of parameters is to provide the user with more versatile, graphical, input controls such as slider bars, radio buttons, knobs, etc. Another approach is to provide the user with a curve or curves on a chart or grid. The curves correspond to values of the parameter with respect to some other variable, such as time, location, etc. The user can drag points on the curve to modify the curve. Thus, the user is able to adjust, for example, RGB components over time or over image areas without having to specify many values for many different points in an image. Other methods of modifying the curves include using math functions to modify the curve's behavior, or to use parameterized math functions that define the curve and change the curve's parameters (as opposed to the parameters that the curve is describing).

This graphical approach to change the values, or functions, on a curve that represents one or more parameters is not without drawbacks. In the first place, a user often needs to know which parameter to change just to call up the necessary display and tools to change the parameter. For example, a user may decide that an area of an image is "blurry" but will not know the parameter to modify in order to make the image less blurry. In some cases, a user may not like an image but will not even be able to describe in words exactly what is wrong with the image. This is especially true when a team of users is attempting to create a media presentation. For example, an art director and digital artist may be collaborating in making a change to an image. The art director may need to express a change to the digital artist but will be unable to do so effectively since the art director typically has less knowledge of image parameters and their effects upon the image.

Thus, it is desirable to provide an invention that improves upon the prior art.

BRIEF SUMMARY OF THE INVENTION

A system providing a user interface to allow a user to easily modify parameters of media presentations such as images and audio. The user selects first and second reference instances, such as images. The images are described by parameters and parameter values. Differences between the images' parameter/value characteristics are identified. The first and second reference images are placed at different points on a display screen. By moving a pointer relative to the positions of the first and second reference images, a current image is generated that is a combination, or function, of the identified parameter/value characteristics. Thus, the user is able to quickly, and intuitively, achieve many desired modifications to the media.

A feature of the invention allows image content to be modified in a similar manner. First and second computer model positions, animations, bitmap images, etc., can be used and the same technique employed to create many derivations from the selected reference images.

Multiple parameters can be changed concurrently. A user can be presented with a list of parameters so that the user can selectively enable or disable parameters to be changed. Other features of the invention are disclosed.

In one embodiment the invention provides a method for varying an attribute of a media presentation. The method including accepting signals from a user input device to select a first media presentation having a parameter with a first value; accepting signals from a user input device to select a second media presentation having the parameter with a second value; accepting signals from a user input device to generate a new value; and presenting, on the media presentation device, a new media presentation using the new value of the parameter.

DETAILED DESCRIPTION OF THE INVENTION

Figure 1A:
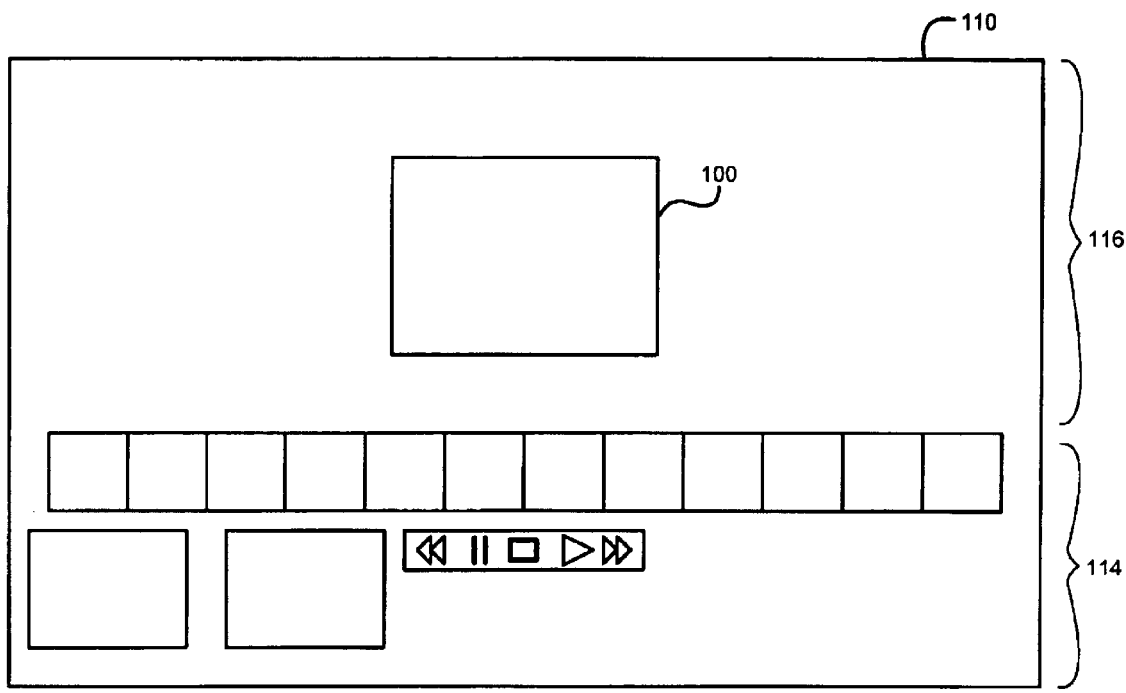
FIG. 1A shows a first screen display of a user interface in a preferred embodiment of the invention.

FIG. 1A shows a first screen display of a user interface in a preferred embodiment of the invention.

In FIG. 1A, display screen 110 is used to display media presentation area 112 and control area 114. In the present example, media presentation area 112 can be a single image from a sequence of images in a movie clip such as would be encountered in a digital video editing, or post-production, system. An example of such a system is discussed in co-pending patent applications (1) SYSTEM AND METHOD FOR OPTIMIZING THE PROCESSING OF IMAGES and (2) SYSTEM AND METHOD FOR INCREASING PERFORMANCE WHEN COMPOSITING IMAGES, both referenced above.

Controls 114 may include standard clip displays, menus, transport controls, etc. A preferred embodiment of the invention places such controls toward the bottom of the screen so that a substantial rectangular portion of the display screen, such as 116, is left free for displays and controls relating to parameter modification.

In the digital video application, area 112 displays a "current" frame. The current frame is frequently changing as frames from a sequence of frames, or clip, are displayed in response to user selection. For example, the current frame may be changing at a rate of 24 or 30 frames, or images, per second. The user can control the rate of change.

A user selects a first reference frame by using a user input device such as a digitizing tablet, mouse, keyboard key press, touch screen, etc. At the moment of selection, whatever frame is the current frame is copied to a predetermined portion of the display screen to become the first reference frame. Any parameters associated with the current frame at the time of selection are also copied and stored, or are otherwise identified as being associated with the first reference frame.

Figure 1B:
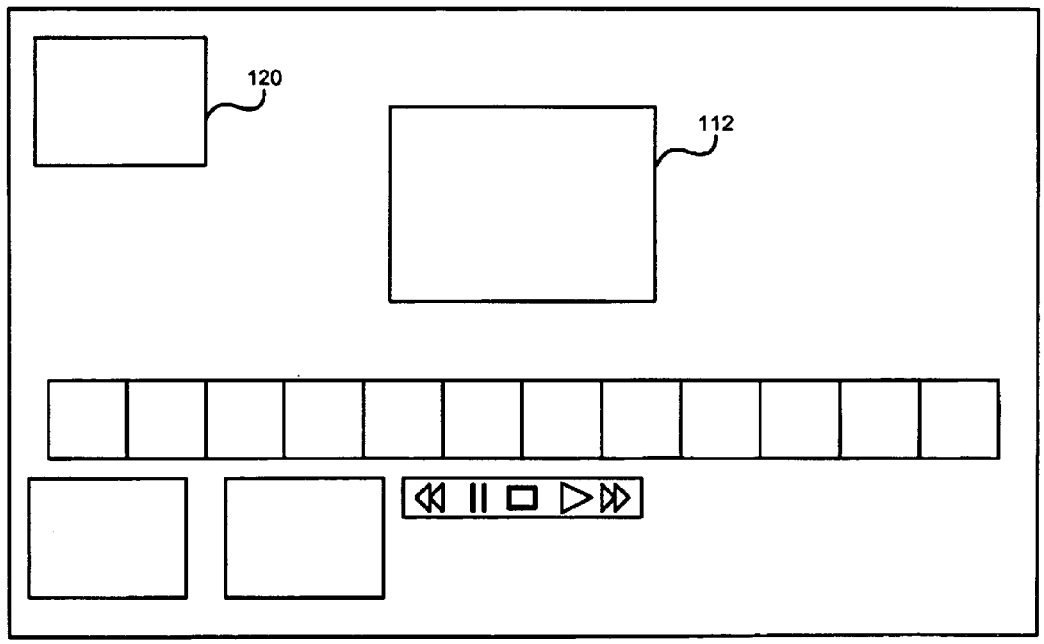
FIG. 1B shows the screen display just after a first reference frame has been selected.

FIG. 1B shows the screen display just after a first reference frame has been selected.

In FIG. 1B, first reference frame 120 is shown positioned at the upper-left corner of the screen. Note that reference frames can be at different resolutions, sizes, etc., from the selected frame. However, it is desirable that the first reference frame, and subsequent reference frames discussed below, accurately depict the original frame from which they were created at the time of selection. As a clip is playing and sequences of images are displayed in area 112, the user again selects a reference frame.

Figure 1C:
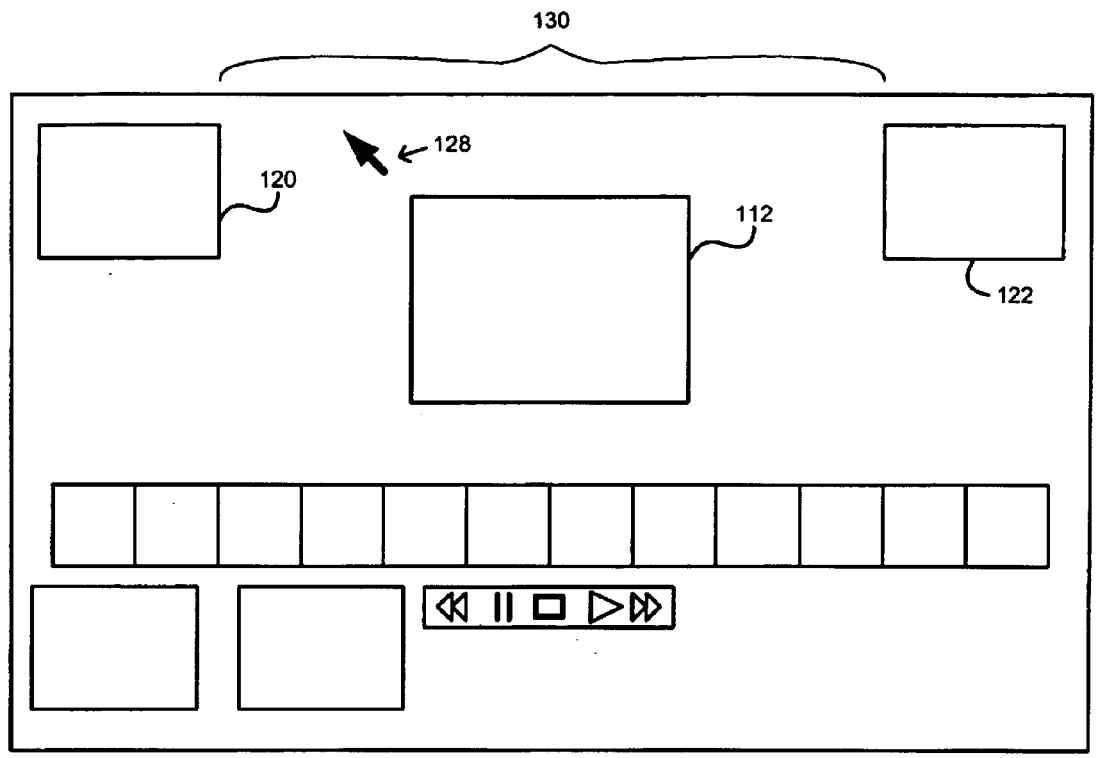
FIG. 1C shows the screen just after a second reference frame has been selected.

FIG. 1C shows the screen just after a second reference frame, or image, has been selected.

In FIG. 1C, second reference frame 122 is an image that is different, in at least one parameter, from first reference frame 120. Second reference frame 122 can come from the same, or different, clip as first reference frame 120. Second reference frame 122 can be a modified form of first reference frame 120 as where an image-modification operation has been applied to the clip containing first reference frame 120 or where an operation has been applied to the original frame from which first reference frame 120 was created. A list of representative operations is shown in Table I. It should be apparent that many additional types of operations are suitable for use with the present invention. In general, the second reference frame can be obtained from any image, whether derived from, related to, or unrelated to, the image that spawned the first reference image.

TABLE I

| | |
|---|---|
| 1. Brightness Adjustment | control of luminance in RGB and Alpha channels. |
| 2. Clamp Effect | restricts pixel values within determined ranges. |
| 3. Contrast | adjusts the range between brightest and darkest tones. |
| 4. Convert | change pixel types between, e.g., 8 bit, 16 bit floating and working. Can also change image types between RGB, RGBA and Alpha channel outputs. |
| 5. Crop | allows trimming an image on the left, right, top or bottom. |
| 6. Dissolve | produces an image that is a mixture of input images. |
| 7. Fade | produces an image that is a mixture of an input image and a solid color. |
| 8. Gain | adjusts the brightness of individual channels of a image or clip. |
| 9. Gamma | adjusts the apparent brightness by altering the middle range of brightness. |
| 10. Invert | reverses an image's color and shades so that black becomes white, white becomes black, red becomes cyan, etc. |
| 11. CMY Graph | adjusts the Cyan, Magenta and Yellow channels. |
| 12. Luma Graph | adjusts the luminance of an image. |
| 13. Monochrome | converts a color image into a monochrome image by adjusting color saturation in each of the color channels. |
| 14. Offset | adjusts the brightness of the individual channels of an image. |
| 15. Swap RGBA | shifts any color channel to become any other color channel. |

Once first and second reference images have been selected and positioned on the display screen, the user can easily modify parameters in relation to the two reference images. A preferred embodiment uses a pointer that is manipulated by a graphics tablet. In a parameter modification mode, after reference images are selected, the user moves pointer 128 between the reference images in the region 130 of FIG. 1C. An interpolated image with a parameter value that is derived from parameter values of both the first and second reference images, and which is dependent upon the distance from the pointer to the first and/or second reference images, is displayed in area 112. A preferred embodiment determines parameter types which are present in only one reference image (i.e., non-shared parameters), and parameter types in common between the reference images but which have different values (i.e., shared parameters). These identified parameters are used to generate a modified parameter set based on the relative distance of the pointer to the reference images.

Figure 2:
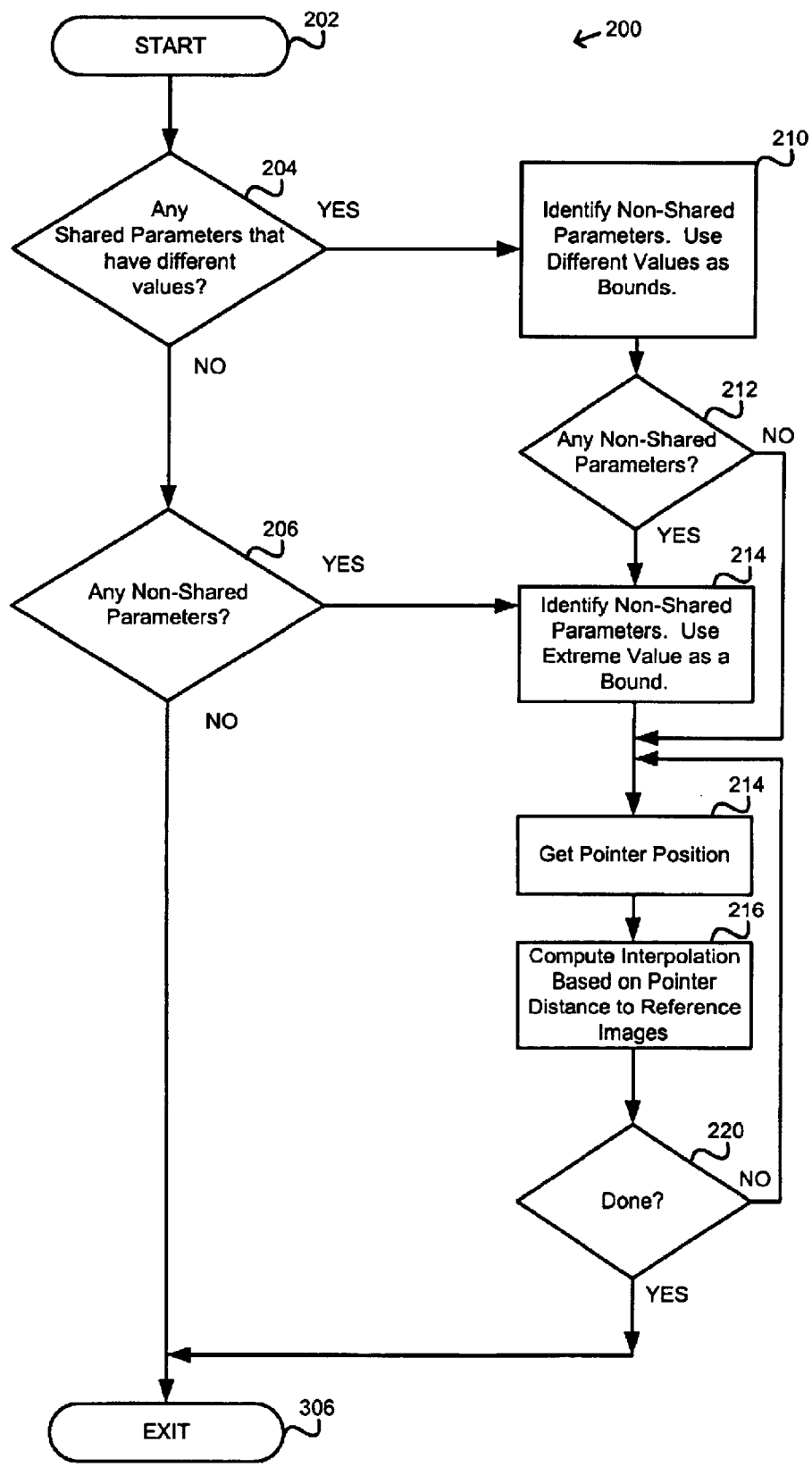
FIG. 2 is a flowchart illustrating basic steps for interpolation of parameter values between reference images.

FIG. 2 is a flowchart illustrating basic steps for interpolation of parameter values between reference images.

In FIG. 2, flowchart 200 is entered at 202 where it is assumed that first and second reference images have been selected and are displayed on the display screen in accordance with the discussion, above.

Step 204 is executed to determine whether there are any shared parameters between the first and second reference images. In other words, if there are parameters of the same type, or name, associated with both the first and second reference images, then the check at step 204 is true and execution proceeds to step 210. However, if there are no parameters in common, execution proceeds, instead, to step 206.

At step 206 a check is made to determine whether there are any parameters associated with only one reference image. If not, execution proceeds to step 208 where the routine is exited since there are no parameters to be interpolated between the first and second reference images.

Returning to step 204, if there are shared parameters with different parameter values, step 210 is executed. At step 210, the different values for each shared parameter are used to set upper and lower bounds for the interpolation. A preferred embodiment provides linear interpolation between parameter value pairs. For example, where a first reference image has parameter value, A, and a second reference image has a parameter value, B, a linear interpolation can be achieved as C=A+(B−A)*x where C is the new parameter value and x varies from 0 to 1 based on a position in relation to either, or both of the positions of the first and second reference images. If the pointer is over the first reference image then x=0 and C=A. If the pointer is over the second reference image then x=1 and C=B. If the pointer is midway between the reference images then x=0.5 and C=(A+B)/2.

When there are multiple shared parameters, the parameters can be interpolated concurrently. In other words, multiple new parameter values for a current image are determined for multiple shared parameters based on a single position of the pointer. Another embodiment can provide a list of the multiple shared parameters to the user. The user can then "disable" selected parameters from modification, as desired. The disabled parameters, even though shared and having different values, will not be modified.

Another possibility is to provide for collaboration in parameter modification among two or more users. Each user can move a pointer in relation to the same, or different, reference images. The two or more users' position selections are then used (e.g., by averaging, weighting, etc.) to arrive at a single new parameter value based on multiple user selections. This approach can be useful to get a "consensus" value that represents a most-popular parameter value such as where the parameter value (or values) are used to select a color, facial expression, clothing style (see below), etc.

Next, a check is made at step 212 for any non-shared (e.g., present in only one of the two reference images) parameter types. If there are no non-shared parameter types, execution proceeds to step 216.

If either of the checks at steps 206 or 212 reveal that there are non-shared parameters, then step 214 is executed to identify the non-shared parameters and to set bounds for parameter interpolation. One of the bounds for interpolation is the value of the non-shared parameter. The second bound for interpolation is chosen to be either the high, or low, extreme of the non-shared parameter. For example, if a first reference image includes a parameter type "fog effect" with a value of 12 where the "fog effect" parameter can have values in the range 0–100, the value 12 is used as a first bound for interpolation while the value 100 is used as the second bound. If the pointer is close to , or in contact with, the first reference image, the interpolated value is 12. If the pointer is close to, or in contact with, the second reference image then the interpolated value is 100.

Note that multiple non-shared parameters can be handled in a manner similar to that described above for shared parameters. Also, both shared and non-shared parameters can be modified at the same time using the same pointer position.

Next, step 216 is executed as the first step in a loop to determine a pointer position and display a modified image in accordance with the pointer position relative to positions of the first and second reference images.

At step 216, a pointer position is obtained. As described above, the user can manipulate the pointer position with the user input device or in any manner as is known in the art. Next, step 218 is executed to compute interpolated parameter values based on the pointer position relative to one or more reference image positions.

At step 220, test is made as to whether the user is done creating new images. If not, execution proceeds back to step 216 where the pointer position can be updated and a new modified image is displayed according to the pointer position. When the user has finished, execution falls to step 208 where the routine exits.

Any suitable programming language can be used to implement the routines of the present invention including C, C++, Java, assembly language, etc. Different programming techniques can be employed such as procedural or object oriented. The routines can execute on a single processing device or multiple processors. Although the flowchart format demands that the steps be presented in a specific order, this order may be changed. Multiple steps can be performed at the same time. The flowchart sequence can be interrupted. The routines can operate in an operating system environment or as stand-alone routines occupying all, or a substantial part, of the system processing. Note that steps can be added to, taken from or modified from the steps in the flowcharts presented in this specification without deviating from the scope of the invention. In general, the flowcharts are only used to indicate one possible sequence of basic operations to achieve a functional aspect of the present invention.

One embodiment of the invention can implement the interpolation technique as a library function, operating system feature, toolkit function, add-on, plug-in, library routine or other process or subprocess that is accessible from an application program, operating system or other software or hardware. In such an approach, the interpolation technique can be a procedure that accepts arguments and returns one or more values. For example, one approach is for the procedure to accept two reference parameters, A and B, and a distance, x, from one or more of the reference images. The distance, x, can be a distance from a pointer position, as discussed above, or it can be a numerical value generated by some other function or criterion. The procedure can return C, the new parameter value based on linear interpolation, as discussed above. Or C can be based on some other formula, function or factors. Such an approach allows a specific user interface to be programmed differently for different applications while the availability of a predetermined piece of code, such as a toolkit function, can be used by programmers to add functionality to an application program, applet, application, etc.

Basic Hardware

Figure 4A:
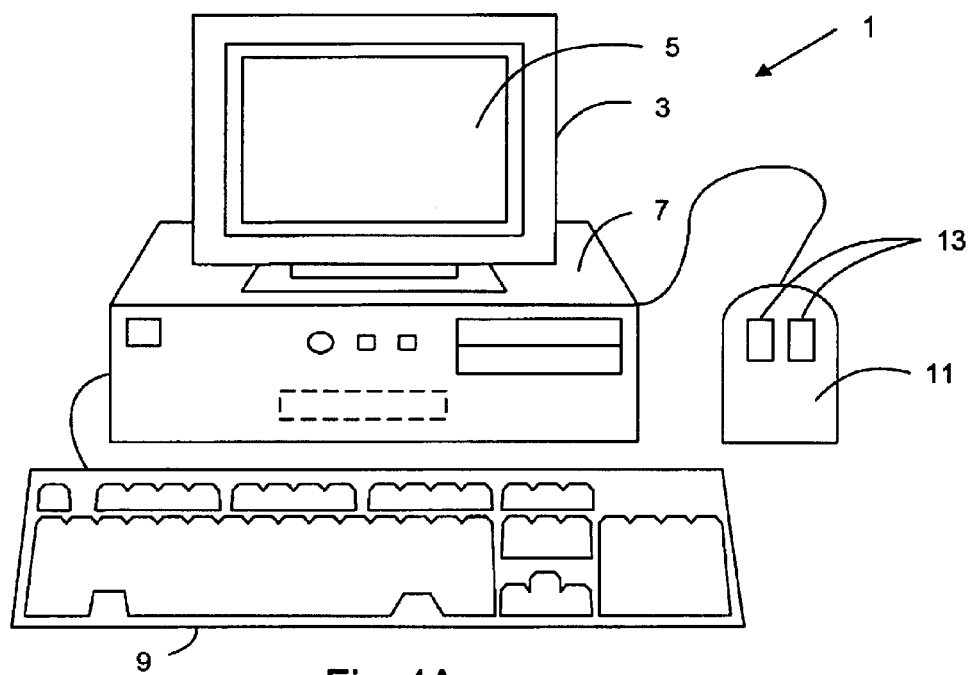
FIG. 4A illustrates a computer system suitable for use with the present invention.
Figure 4B:
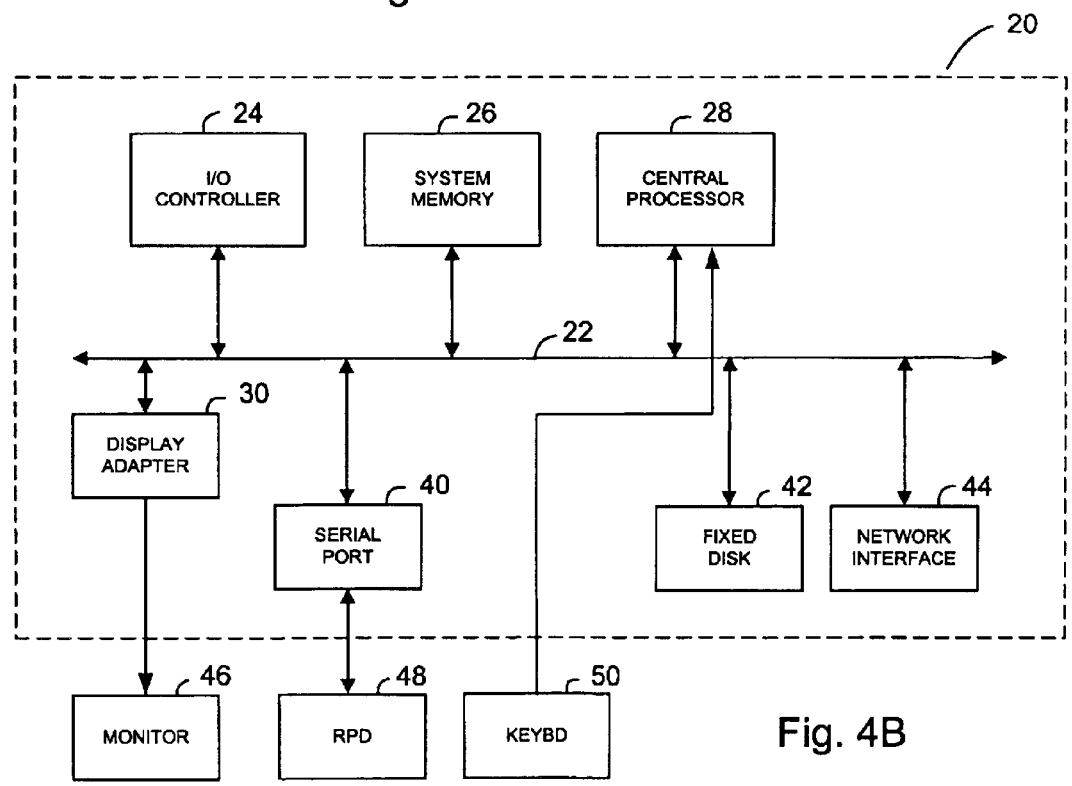
FIG. 4B shows basic subsystems in the computer system of FIG. 4A.

FIGS. 4A and 4B illustrate basic hardware components suitable for practicing the present invention.

FIG. 4A is an illustration of computer system 1 including display 3 having display screen 5. Cabinet 7 houses standard computer components (not shown) such as a disk drive, CDROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, etc. can be used. Other media presentation devices other than display screen 5 may be used such as projection displays, wearable computer monitor (e.g., "dataglass"), etc. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 4B illustrates subsystems that might typically be found in a computer such as computer 1.

In FIG. 4B, subsystems within box 20 are directly interfaced to internal bus 22. Such subsystems typically are contained within the computer system such as within cabinet 7 of FIG. 4A. Subsystems include input/output (I/O) controller 24, System Memory (or random access memory "RAM") 26, central processing unit CPU 28, Display Adapter 30, Serial Port 40, Fixed Disk 42, Network Interface Adapter 44. The use of bus 22 allows each of the subsystems to transfer data among subsystems and, most importantly, with the CPU. External devices can communicate with the CPU or other subsystems via bus 22 by interfacing with a subsystem on the bus. Thus, Monitor 46 connects with Display Adapter 30, a relative pointing device (e.g. a mouse) connects through Serial Port 40. Some devices such as Keyboard 50 can communicate with the CPU by direct means without using the main data bus as, for example, via an interrupt controller and associated registers.

As with the external physical configuration shown in FIG. 4A, many subsystem configurations are possible. FIG. 4B is illustrative of but one suitable configuration. Subsystems, components or devices other than those shown in FIG. 4B can be added. A suitable computer system can be achieved without using all of the subsystems shown in FIG. 4B. For example, a standalone computer need not be coupled to a network so Network Interface 44 would not be required. Other subsystems such as a CDROM drive, graphics accelerator, etc. can be included in the configuration without affecting the performance of the system of the present invention.

Although the invention is described with respect to interpolation between two reference images, any number of reference images can be used. For example, FIG. 1D illustrates the use of four reference images.

Figure 1D:
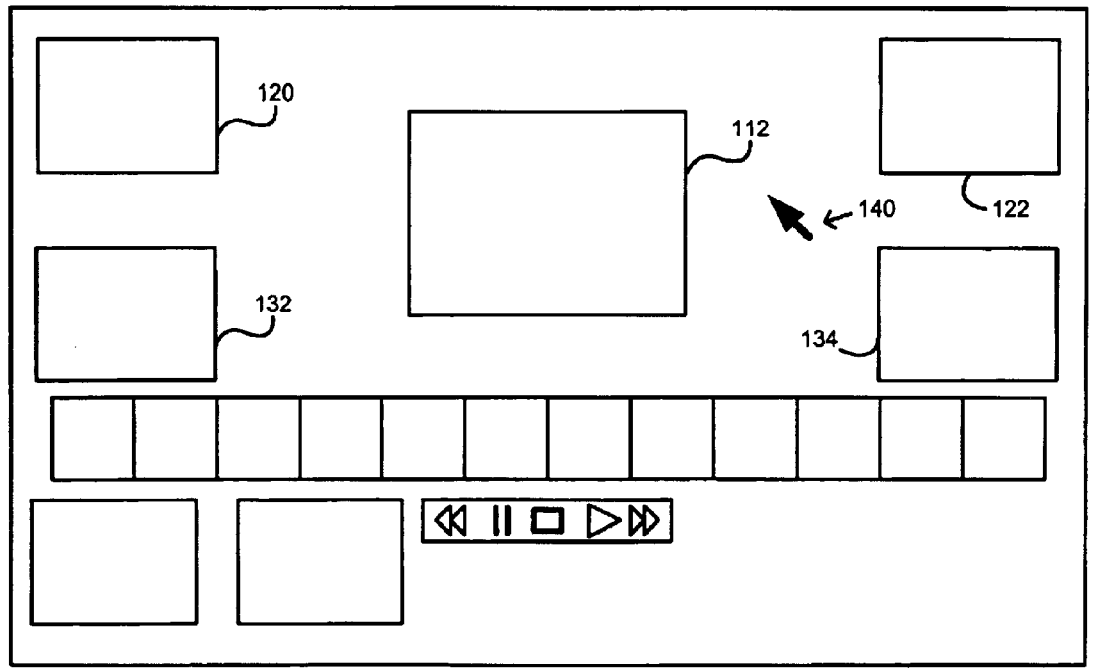
FIG. 1D illustrates the use of four reference images.

In FIG. 1D, third and fourth reference images 132 and 134, respectively, are shown along with 20, second image 122 and current image 112. Picture 140 is shown at an arbitrary position on the screen. As discussed, the position of pointer 140 with respect to one or more of the reference images on the screen is used to create variations, or interpolations, of parameter values along the various reference images. A parameter value can be determined among three or more reference images by using the distance from the pointer to each image as a weighting factor on each image's parameter value. Other functions can be employed to calculate a modified parameter value based on reference image parameter values. A modified parameter need not be present in all of the multiple reference images.

Any matter of deriving parameter values based on one or more reference image parameter values and the position of pointer 140 with respect to one or more of the reference images is possible. For example, where two reference images are used, simple linear interpolation of a single distance along a single dimension, such as the horizontal, or "axis" direction, is possible. Other approaches can use the relative distance between the pointer and one or more images, distances between images themselves in relation to the pointer distance, exponential, logarithmic, or other computational approaches. The pointer can be positioned anywhere on the screen including the region of current image 112, the control surfaces toward the bottom of the screen, etc. Where multi-screen displays are used, the pointer can either be positioned on a different display screen, device, system, etc. Where the pointer is moved beyond one or more of the reference images, then extrapolation, rather than interpolation, can be used to generate parameter values. In general, any means of generating parameter values that uses parameter values of one or more reference images along with relative position of a pointer with respect to one or more reference image position is suitable for use with this invention.

Thus, the invention provides a simple way for a user to easily manipulate many complicated parameter types by relying on intuitive and easily understood visual cues and effects. For example, an art director can select two different contrast settings of similar frames in a clip. By simply moving the pointer between the two frames (e.g., closer to or further away from a frame of lighter or darker contrast), the desired contrast can be instantly, and easily, obtained. Note that this approach works well for many types of visual parameter modifications since the image, itself, is usually not considered a parameter. In other words, the actual image content in each frame is always changing in a typical movie clip. However, the vast majority of parameter settings do not change quickly, or often, compared to the image content of the frame. Thus, for example, a frame that is desired to be changed can be selected as a first reference image while a second frame that subjectively "looks" like it could contribute to a desired modification can be selected as a second reference image. The pointer can be moved from the first image toward (or beyond) the second image successively until the desired amount of change is achieved. One embodiment of the invention provides that when the pointer is moved over the reference image, that reference image's parameters are copied exactly into the parameter values for the current image. This approach allows libraries of different reference images having basic parameter modifications to be saved and called-up for later use.

The present invention can be used in more than two dimensions. For example, a virtual reality display device (or a two dimensional display device used to display three-dimensions), can represent three dimensions so that a user is provided with more possibilities in selecting position and distances of the pointer and reference images. Other input devices can be used such as a data glove, 3D track balls, etc.

Although the invention has been discussed primarily with respect to digital image processing, it should be apparent that digital audio processing, and other types of processing, are also suitable with this invention. In the case of audio processing, portions of waveforms are typically visually represented on the screen in the manner similar to images. The waveform portions can also be represented by icons or graphical images. Each of these visual representations of sound can be handled similarly to reference images, as discussed above. When a current audio portion is selected, that audio portion can be visually represented in a portion of the screen display such as in the corners.

With reference to FIG. 1C, first reference audio sample 120 can have a first level of reverb as set by a value in a "reverb" parameter. Second reference audio sample 122 can have a second level of the same "reverb" parameter and can be placed in a second portion of the screen display. Modification of the reverb parameter value can be achieved by moving pointer 128 between the two visual representations of the waveforms in the region 130 or by moving the pointer top of, or to the right or left of each reference audio sample. Naturally, any other parameter or parameters of audio waveforms can be handled in a similar manner.

Another application of the present invention is to vary image content, as opposed to varying operations on image content. In this case, the visual content and images should be expressed as a set of parameters, attributes, functions or other characteristics that can be identified and varied.

For example, a computer model, bitmap, animation or other computer-based image can be modified in position, shape, style, etc., according to the system of the present invention. A model of a human figure can be rendered in different positions on a display screen. Instances of the rendering can be selected as first and second reference images. Such an approach is shown in FIG. 3.

Figure 3:
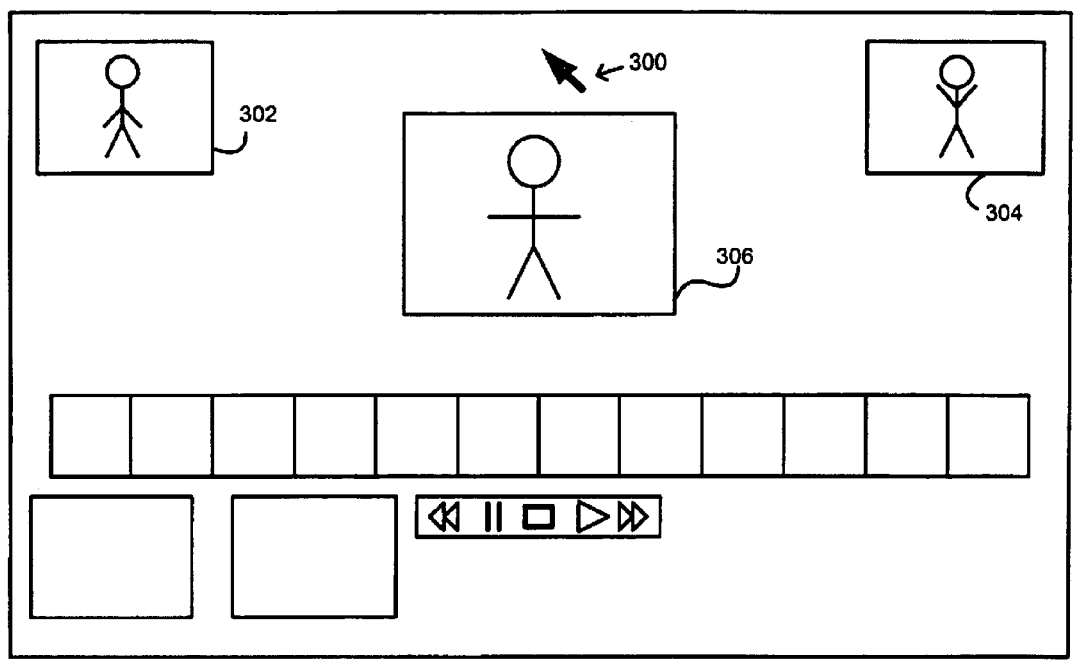
FIG. 3 illustrates modification of image content.

In FIG. 3, images 302 and 304 are the first and second rendered reference images. Pointer 300 is shown in a position roughly partway between the two reference images. The first reference image is a computer model of a human figure showing arms in a lower position while the second reference image 304 is a computer model of a human figure with arms in a raised position. Since pointer 300 is positioned about mid-way between two reference images, the resulting current image 306 is a computer model of a human figure with arms halfway raised. As pointer 300 is moved to the right, closer to reference image 304, the arms in current image 306 will rise. As pointer 300 is moved to the left, closer to reference image 302, the arms in current image 306 will lower. Naturally, any other type of animation, movement or positioning of computer models can be manipulated in the same manner. This could be particularly useful for facial animations where precise placements and relationship between eyes, cheeks, mouths, brows, etc. is very important to convey nuances of expression. It should be apparent that many uses of the present technique of manipulating computer models based on reference images and pointer positioning are possible.

The invention is also applicable to series of images, or clips. For example, in FIG. 1C, first reference image 302 and second reference image 304 can be clips of a few seconds of a figure running. The clips can be looped for continuous playback. First reference image 302 shows the figure running with arms lowered while second reference image 304 shows the figure running with arms raised. The positioning of pointer 128 causes clip playback in the current image 306 to exhibit behavior similar to that with the static image, discussed above, except that the figure is shown in an animated run. The use of clips allows an animator, modeler or other user to create more lifelike animations.

Yet another application of the present invention includes modifying images by swapping bitmap portions. For example, a problem with purchasing goods over the Internet is that a consumer is not able to adequately observe the article being purchased before the purchase must occur. This is particularly problematic where the consumer is buying goods such as clothes, manipulable articles of manufacture, etc. One application of the present invention would allow consumers to pick first and second (or more) reference images such as a dress with images of long and short hemlines. The pointer is moved between the two images to achieve the desired hemline. Similarly, colors of articles or other design nuances can be varied. For example, a low or high collar, narrow or wide lapel, tie, hat brim, etc. can all be varied based on selections of two different images. Note that as long as each of the qualities of clothing are expressed in attributes or parameters (or other forms of mathematical or data description), multiple different parameters can be changed easily so that one article of clothing can be made to adopt characteristics of another. The consumer can select the appropriate level of characteristic adoption and notify the seller that they are interested in such an article. The seller can then find the closest match to the consumer's preferred parameters within the seller's inventory and supply the seller with that article.

Although the present invention is described predominantly with respect to a visual image processing system, many types of systems that include media presentation features can employ the present invention. Such systems include, but are not limited to, audio, animation, modeling, computer-aided design, web browsing or access, etc.

Although the invention has been discussed in connection with parameters and parameter values, other structures for modifying media instances, such as attribute/value pairs, arrays, lists, etc., can be employed. In general, a parameter, or other data structure, used to describe an image need not only have a single value. Multiple values, data structures, functions, etc., can be used to define parameter values either continuously or discretely. For example, where a function is used to define parameter values over space, time, etc., the present invention can check for different functions associated with shared parameter types as opposed to merely checking for different values, as described above.

Although screen displays such as 1A–D illustrate the invention in connection with a digital editing system, many other applications are possible. Other embodiments need not devote screen area to specific controls, such as the controls at 114 of FIG. 1A. It should be apparent that the entire screen, or different portions of the screen, can be used for media presentation and parameter modification as described herein.

Note that the presence of visual indicators for the reference images is not strictly necessary. For example, a user can select first and second reference images and the images need not be shown in positions on the display for interpolation to occur. The positions of the reference images can be understood to be in, e.g., the top-left and top-right corners, or anywhere else. The user can merely move the pointer across an area predefined to be used as the interpolation area, with or without the display of reference images, and a current image can be modified according to the details discussed, above.

Thus, the scope of the invention is to be determined solely by the appended claims.

What is claimed is:

1. A method for varying an attribute of a frame in a media presentation, wherein the attribute is derived from a parameter having a value, the method using a processing system including a user input device and media presentation device, the method comprising:

accepting signals from a user input device to select a first frame having a parameter with a first value;

accepting signals from a user input device to select a second frame having the parameter with a second value;

accepting signals from a user input device to generate a new value by interpolating between the first and second values;

presenting, on the media presentation device, a new media presentation using the new value of the parameter;

wherein the media presentation device includes a display screen, the method further comprising displaying images on the display screen;

displaying the first and second frames at different positions on the display screen;

accepting signals from a user input device to select a position on the display screen;

determining the new value by using the distances between the selected position and the positions of the first and second images;

displaying the first image at a first corner of a predefined area of the display screen;

displaying the second image at a second corner of a predefined area of the display screen; and displaying the new media presentation at the center of the display, wherein the new media presentation includes a new image displayed by using the new value.

2. A method for varying an attribute of a frame in a media presentation, wherein the attribute is derived from a parameter having a value, the method using a processing system including a user input device and media presentation device, the method comprising:

accepting signals from a user input device to select a first frame having a parameter with a first value;

accepting signals from a user input device to select a second frame having the parameter with a second value;

accepting signals from a user input device to generate a new value by interpolating between the first and second values;

presenting, on the media presentation device, a new media presentation using the new value of the parameter;

wherein the media presentation device includes audio waveforms playback;

wherein the first and second media presentations include first and second images, respectively, wherein the first and second images correspond to first and second audio waveforms, respectively, wherein the media presentation device includes a display screen, the method further comprising displaying the first and second frames at different positions on the display screen;

accepting signals from a user input device to select a position on the display screen;

determining the new value by using the distances between the selected position and the positions of the first and second images;

displaying the first image at a first corner of a predefined area of the display screen;

displaying the second image at a second corner of a predefined area of the display screen; and displaying the new media presentation at the center of the display, wherein the new media presentation includes a new image displayed by using the new value.

3. The method of claim 1, wherein the media presentation device includes display of non-linear animation.

4. The method of claim 3, wherein the non-linear animation includes a rendered view of a computer model.

5. The method of claim 4, wherein the rendered model includes facial animation.

6. The method of claim 1, wherein inputs from multiple user input devices are used to generate a collaborative new value for the parameter.

7. The method of claim 6, wherein two or more user input devices are in separate locations.

8. The method of claim 1, further comprising displaying a list of parameters to be modified;

accepting signals from a user input device to select one or more parameters; and generating a modified image by changing only the selected one or more parameters.

9. The method of claim 1, wherein at least one parameter is associated with modification of visual content of an image.

10. An apparatus for varying an attribute of a media presentation, wherein the attribute is derived from a parameter having a value, the method using a processing system including a user input device and media presentation device, the apparatus comprising:

a processor;

a user input device coupled to the processor;

a machine-readable medium including instructions executable by the processor for accepting signals from the user input device to select a first frame having a parameter with a first value;

accepting signals from a user input device to select a second frame having the parameter with a second value;

accepting signals from a user input device to generate a new value by interpolating between the first and second values;

presenting, on the media presentation device a new media presentation using the new value of the parameter;

wherein the media presentation device includes a display screen, the method further comprising displaying images on the display screen;

displaying the first and second frames at different positions on the display screen;

accepting signals from a user input device to select a position on the display screen;

determining the new value by using the distances between the selected position and the positions of the first and second images;

displaying the first image at a first corner of a predefined area of the display screen;

displaying the second image at a second corner of a predefined area of the display screen; and displaying the new media presentation at the center of the display, wherein the new media presentation includes a new image displayed by using the new value.

11. A computer program embodied on a computer-readable medium for varying an attribute of a media presentation, wherein the attribute is derived from a parameter having a value, the computer-readable medium comprising one or more instructions for accepting signals from the user input device to select a first frame having a parameter with a first value;

one or more instructions for accepting signals from a user input device to select a second frame having the parameter with a second value;

one or more instructions for accepting signals from a user input device to generate a new value by interpolating between the first and second values;

one or more instructions for presenting, on the media presentation device, a new media presentation using the new value of the parameter;

wherein the media presentation device includes a display screen, the computer-readable medium further comprising one or more instructions for displaying images on the display screen;

one or more instructions for displaying the first and second frames at different positions on the display screen;

one or more instructions for accepting signals from a user input device to select a position on the display screen;

one or more instructions for determining the new value by using the distances between the selected position and the positions of the first and second images;

one or more instructions for displaying the first image at a first corner of a predefined area of the display screen;

one or more instructions for displaying the second image at a second corner of a predefined area of the display screen; and one or more instructions for displaying the new media presentation at the center of the display, wherein the new media presentation includes a new image displayed by using the new value.

* * * * *